United States Patent
Chang et al.

(10) Patent No.: US 10,007,361 B2
(45) Date of Patent: Jun. 26, 2018

(54) CAPACITIVE TOUCH SENSOR AND CAPACITIVE PEN

(71) Applicant: EGALAX_EMPIA TECHNOLOGY INC., Taipei (TW)

(72) Inventors: Chin-Fu Chang, Taipei (TW); Shang-Tai Yeh, Taipei (TW); Shih-Hao Chiu, Taipei (TW)

(73) Assignee: EGALAX_EMPIA TECHNOLOGY INC., Taipei (TW)

( * ) Notice: Subject to any disclaimer, the term of this patent is extended or adjusted under 35 U.S.C. 154(b) by 90 days.

(21) Appl. No.: 13/716,880

(22) Filed: Dec. 17, 2012

(65) Prior Publication Data

US 2013/0155016 A1   Jun. 20, 2013

Related U.S. Application Data

(60) Provisional application No. 61/577,175, filed on Dec. 19, 2011.

(51) Int. Cl.
*G06F 3/041* (2006.01)
*G06F 3/0354* (2013.01)
*G06F 3/0488* (2013.01)
*G06F 3/044* (2006.01)

(52) U.S. Cl.
CPC .......... *G06F 3/03545* (2013.01); *G06F 3/044* (2013.01); *G06F 3/0416* (2013.01); *G06F 3/0488* (2013.01)

(58) Field of Classification Search
CPC . G06F 3/041; G06F 3/00; G06F 3/033; G06F 3/044; G06F 3/0488; G06F 3/0416

USPC .............. 178/18.03; 345/173–174, 179, 175; 715/863

See application file for complete search history.

(56) References Cited

U.S. PATENT DOCUMENTS

| | | | |
|---|---|---|---|
| 2006/0161870 A1* | 7/2006 | Hotelling et al. | 715/863 |
| 2008/0158167 A1* | 7/2008 | Hotelling et al. | 345/173 |
| 2008/0165154 A1* | 7/2008 | Kim | G06F 3/0488 345/173 |
| 2009/0025987 A1* | 1/2009 | Perski et al. | 178/18.03 |
| 2010/0097328 A1* | 4/2010 | Simmons | G06F 3/0416 345/173 |
| 2010/0315384 A1* | 12/2010 | Hargreaves et al. | 345/179 |
| 2011/0221695 A1 | 9/2011 | Wu | |
| 2011/0304577 A1 | 12/2011 | Brown et al. | |
| 2012/0105361 A1* | 5/2012 | Kremin et al. | 345/174 |
| 2012/0287054 A1* | 11/2012 | Kuo et al. | 345/173 |

FOREIGN PATENT DOCUMENTS

| | | |
|---|---|---|
| TW | M368843 | 11/2009 |
| TW | 201131454 | 9/2011 |

* cited by examiner

*Primary Examiner* — Abdul-Samad A Adediran
(74) *Attorney, Agent, or Firm* — WPAT, PC

(57) ABSTRACT

When a touch sensor is approached or touched by an object having a small area, the corresponding approach or touch signal might be slightly less than the threshold originally used for normal detection. By comparing the sum of the corresponding approach or touch signal and some adjacent signals with the threshold, the approach or touch of a small-area object that otherwise would not be detected by the original method can be determined.

26 Claims, 5 Drawing Sheets

CAPACITIVE TOUCH SENSOR AND CAPACITIVE PEN

CROSS REFERENCE TO RELATED PATENT APPLICATION

This patent application claims the domestic priority of the U.S. provisional application 61/577,175 filed on Dec. 19, 2011, and hereby incorporated by reference.

BACKGROUND OF THE INVENTION

1. Field of the Invention

The present invention relates to a capacitive touch sensor, and more particularly, to a capacitive touch sensor capable of detecting a capacitive pen with a small pen head.

2. Description of the Prior Art

A conventional mutual capacitive sensor is shown includes an insulating surface layer, a first conductive layer, a dielectric layer, a second conductive layer. The first conductive layer and the second conductive layer have a plurality of first conductive strips and a plurality of second conductive strips, respectively. Each of these conductive strips can be made up by a plurality of conductive pads and connecting lines 19 connected to the conductive pads in series.

In the process of mutual capacitive detection, one of the first conductive layer and the second conductive layer is driven, while the other of the first conductive layer and the second conductive layer is detected. For example, a driving signal is sequentially provided to each first conductive strip, and corresponding to each first conductive strip provided with the driving signal, signals from all of the second conductive strips are detected, which represent capacitive coupling signals at the intersections between the first conductive strip provided with the driving signal and all the second conductive strips. As a result, capacitive coupling signals at the intersections between all the first and second conductive strips are obtained to form an image of capacitive values.

The image of capacitive values at the time when there is no external touches is obtained as a reference. By comparing the difference between the reference image and the image of capacitive values later detected, the touch or approach of an external conductive object can be determined, and furthermore, the position touched or approached by the external conductive object can be determined.

However, the magnitude of this difference between the reference image and the image of capacitive values later detected is proportional to the area on the touch sensor approached or touched by an external conductive object, thus the area must be sufficiently large in order to be identified. Such a limitation therefore dictates the size of the pen head of a passive capacitive pen to be relatively large, preferably larger than 4 mm. The large pen head may block the view of a user from seeing the tip of the pen during writing. As a result, writing may not be accurately made at desired locations.

From the above it is clear that prior art still has shortcomings. In order to solve these problems, efforts have long been made in vain, while ordinary products and methods offering no appropriate structures and methods. Thus, there is a need in the industry for a novel technique that solves these problems.

SUMMARY OF THE INVENTION

When a touch sensor is approached or touched by an object of a small area, the corresponding approach or touch signal might be slightly less than the threshold originally used for normal external conductive object detection. An objective of the present invention is to determine an approach or a touch of a small-area object that otherwise would not be detected by the original method by comparing the sum of the corresponding approach or touch signal and some adjacent signals with the threshold.

The above and other objectives of the present invention can be achieved by the following technical scheme. A method for detecting an approach or a touch of a small area proposed by the present invention includes: obtaining an image of change in capacitive coupling from a capacitive touch sensor, wherein the capacitive touch sensor includes a plurality of driven conductive strips driven by a driving signal and a plurality of sensed conductive strips providing changes in capacitive coupling, each time the driving signal is provided, one or more intersections between one or more of the conductive strips being simultaneously driven by the driving signal and each sensed conductive strip generate capacitive coupling, and each value in the image of change in capacitive coupling is the change in capacitive coupling for one of the intersections; detecting each detected intersection from the image of change in capacitive coupling, wherein the value of the detected intersection is smaller than a first threshold and larger than a second threshold; detecting each first region, wherein each first region includes one of the detected intersections and an intersection adjacent to the detected intersection, and the sum of values of the first region is greater than the first threshold; detecting each second region if no first region is detected, wherein each second region includes four adjacent intersections including one of the detected intersections, and the sum of values of the second region is greater than the first threshold; and determining a first region or a second region approached or touched by an external conductive object when at least one first region or at least one second region is detected, wherein the values of all intersections adjacent to the first region or the second region approached or touched by the external conductive object are all smaller than a third threshold.

The above and other objectives of the present invention can further be achieved by the following technical scheme. A device for detecting an approach or a touch of a small area proposed by the present invention includes: a means for obtaining an image of change in capacitive coupling from a capacitive touch sensor, wherein the capacitive touch sensor includes a plurality of driven conductive strips driven by a driving signal and a plurality of sensed conductive strips providing changes in capacitive coupling, each time the driving signal is provided, one or more intersections between one or more of the conductive strips being simultaneously driven by the driving signal and each sensed conductive strip generate capacitive coupling, and each value in the image of change in capacitive coupling is the change in capacitive coupling for one of the intersections; a means for detecting each detected intersection from the image of change in capacitive coupling, wherein the value of the detected intersection is smaller than a first threshold and larger than a second threshold; a means for detecting each first region, wherein each first region includes one of the detected intersections and an intersection adjacent to the detected intersection, and the sum of values of the first region is greater than the first threshold; a means for detecting each second region if no first region is detected, wherein each second region includes four adjacent intersections including one of the detected intersections, and the sum of values of the second region is greater than the first threshold; and a means for determining a first region or a second region approached or touched by an external conductive object when at least one first region or at least one second region is detected, wherein the values of all intersections adjacent to the first region or the second region approached or touched by the external conductive object are all smaller than a third threshold.

The above and other objectives of the present invention can further be achieved by the following technical scheme. A method for detecting an approach or a touch of a small area proposed by the present invention includes: obtaining an image of change in capacitive coupling from a capacitive touch sensor, wherein the capacitive touch sensor includes a plurality of driven conductive strips driven by a driving signal and a plurality of sensed conductive strips providing changes in capacitive coupling, each time the driving signal is provided, one or more intersections between one or more of the conductive strips being simultaneously driven by the driving signal and each sensed conductive strip generate capacitive coupling, and each value in the image of change in capacitive coupling is the change in capacitive coupling for one of the intersections; detecting each detected intersection from the image of change in capacitive coupling, wherein the value of the detected intersection is smaller than a first threshold and larger than a second threshold; detecting each first region, wherein each first region includes one of the detected intersections and an intersection adjacent to the detected intersection, and the sum of values of the first region is greater than the first threshold; and when at least one first region is detected, detecting a first region approached or touched by an external conductive object, wherein the values of all intersections adjacent to the first region approached or touched by the external conductive object are all smaller than a third threshold.

The above and other objectives of the present invention can further be achieved by the following technical scheme. A device for detecting an approach or a touch of a small area proposed by the present invention includes: a means for obtaining an image of change in capacitive coupling from a capacitive touch sensor, wherein the capacitive touch sensor includes a plurality of driven conductive strips driven by a driving signal and a plurality of sensed conductive strips providing changes in capacitive coupling, each time the driving signal is provided, one or more intersections between one or more of the conductive strips being simultaneously driven by the driving signal and each sensed conductive strip generate capacitive coupling, and each value in the image of change in capacitive coupling is the change in capacitive coupling for one of the intersections; a means for detecting each detected intersection from the image of change in capacitive coupling, wherein the value of the detected intersection is smaller than a first threshold and larger than a second threshold; a means for detecting each first region, wherein each first region includes one of the detected intersections and an intersection adjacent to the detected intersection, and the sum of values of the first region is greater than the first threshold; and a means for detecting a first region approached or touched by an external conductive object when at least one first region is detected, wherein the values of all intersections adjacent to the first region approached or touched by the external conductive object are all smaller than a third threshold.

The above and other objectives of the present invention can further be achieved by the following technical scheme. A method for detecting an approach or a touch of a small area proposed by the present invention includes: obtaining an image of change in capacitive coupling from a capacitive touch sensor, wherein the capacitive touch sensor includes a plurality of driven conductive strips driven by a driving signal and a plurality of sensed conductive strips providing changes in capacitive coupling, each time the driving signal is provided, one or more intersections between one or more of the conductive strips being simultaneously driven by the driving signal and each sensed conductive strip generate capacitive coupling, and each value in the image of change in capacitive coupling is the change in capacitive coupling for one of the intersections; detecting each intersection with a value greater than a first threshold from the image of change in capacitive coupling; and determining a single intersection of an approach or a touch of a small area by each external conductive object when at least one intersection with the value greater than the first threshold is detected, wherein all intersections adjacent to the single intersection of the approach or touch of a small area by each external conductive object are all smaller than the first threshold.

With the above technical schemes, the present invention achieve at least the following advantages and beneficial effects:

1. The approach or touch of a pen head with an area smaller than traditional capacitive pens can be detected; and
2. The approach of an external conductive object with a smaller area suspending in the air can be detected.

BRIEF DESCRIPTION OF THE DRAWINGS

The present invention can be more fully understood by reading the following detailed description of the preferred embodiments, with reference made to the accompanying drawings, wherein:

FIGS. 2B to 2G are schematic diagrams illustrating a first region and a second region according to the first embodiment of the present invention.

DETAILED DESCRIPTION OF THE PREFERRED EMBODIMENTS

Figure 1A:
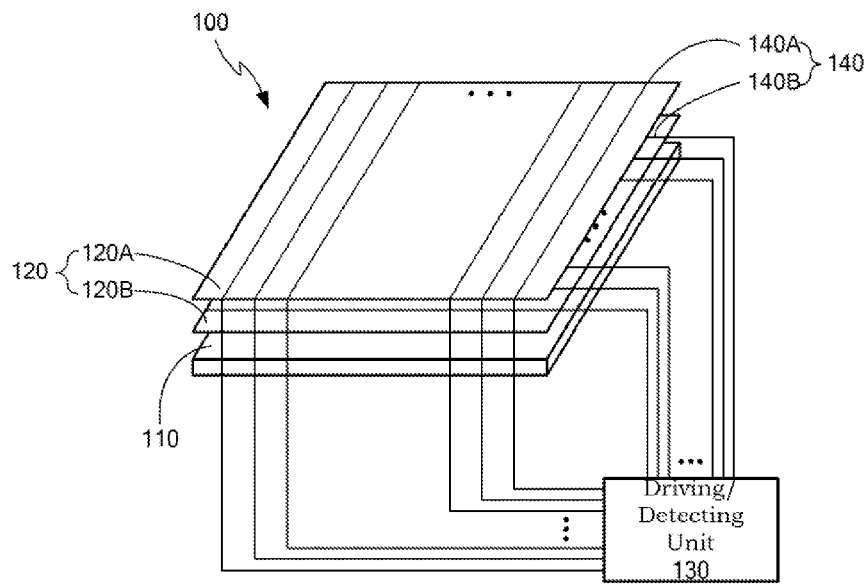
FIGS. 1A and 1B are schematic diagrams illustrating a mutual capacitive sensor.

Some embodiments of the present invention are described in details below. However, in addition to the descriptions given below, the present invention can be applicable to other embodiments, and the scope of the present invention is not limited by such, rather by the scope of the claims. Moreover, for better understanding and clarity of the description, some components in the drawings may not necessary be drawn to scale, in which some may be exaggerated relative to others, and irrelevant parts are omitted.

Referring to FIG. 1A, the present invention provides a position detecting device 100, which includes a sensing device 120 and a driving/detecting unit 130. The sensing device 120 has a sensing layer. In an example of the present invention, the sensing layer can include a first sensing layer 120A and a second sensing layer 120B. The first and second sensing layers 120A and 120B each has a plurality of conductive strips 140, wherein the first conductive strips 140A of the first sensing layer 120A and the second conductive strips 140B of the second sensing layer 120B cross each other. In another example of the present invention, the first and second conductive strips 140A and 140B are disposed on a co-planar sensing layer. The driving/detecting unit 130 produces sensing information based on signals of the conductive strips 140. In the case of self-capacitive detection, for example, conductive strips 140 that are being driven are detected. In the case of mutual-capacitive detection, some of the conductive strips 140 that are not being directly driven by the driving/detecting unit 130 are detected. In addition, the sensing device 120 can be disposed on a display 110. An optional rear shielding layer (not shown) can be interposed between the sensing device 120 and the display 110. In a preferred example of the present invention, there is no rear shielding layer between the sensing device 120 and the display 110 so as to reduce the thickness of the sensing device 120.

The first and second conductive strips can be a plurality of column conductive strips and row conductive strips arranged in columns and rows; a plurality of first dimensional conductive strips and second dimensional conductive strips arranged in first and second dimensions; or a plurality of first axial conductive strips and second axial conductive strips arranged in first and second axes. In addition, the first and second conductive strips can be arranged in orthogonal or non-orthogonal directions. For example, in a polar coordinate system, one of the first and second conductive strips can be arranged in radial direction, and the other one of the first and second conductive strips can be arranged in circular direction. Furthermore, one of the first and second conductive strips can be driving conductive strips, while the other one of the first and second conductive strips can be detecting conductive strips. Said "first dimension" and "second dimension", "first axis" and "second axis", "driving" and "detecting", "driven" or "detected" conductive strips can be used to mean said "first and "second" conductive strips, including but not limited to, being arranged in orthogonal grids, and in any other geometric configurations comprising first dimensional and second dimensional intersecting conductive strips.

Figure 1B:
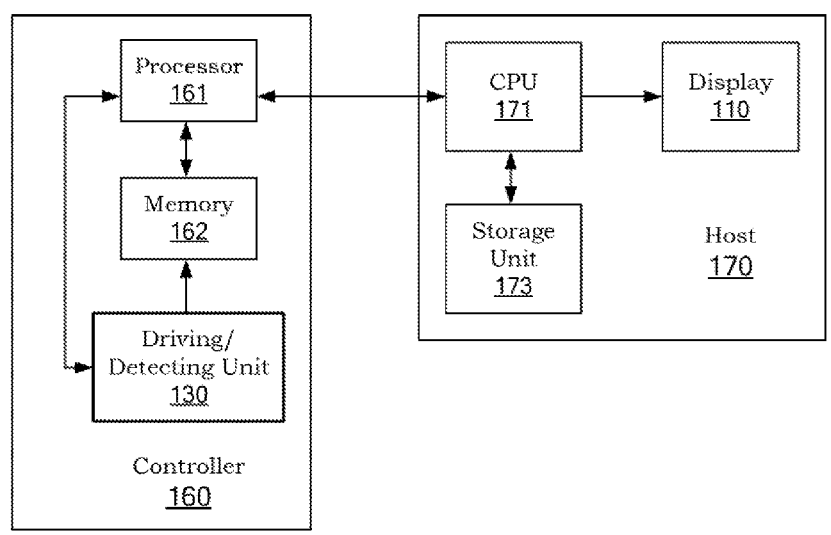

The position detecting device 100 of the present invention can be applied to a computing system as shown in FIG. 1B, which includes a controller 160 and a host 170. The controller includes the driving/detecting unit 130 to operatively couple the sensing device 120 (not shown). In addition, the controller 160 can include a processor 161 for controlling the driving/detecting unit 130 in generating the sensing information. The sensing information can be stored in a memory 162 and accessible by the processor 161. Moreover, the host 170 constitutes the main body of the computing system, and mainly includes a central processing unit 171, a storage unit 173 that can be accessed by the central processing unit 171, and the display 110 for displaying results of operations.

In another example of the present invention, there is a transmission interface between the controller 160 and the host 170. The controlling unit transmits data to the host via the transmission interface. One with ordinary skill in the art can appreciate that the transmission interface may include, but not limited to, UART, USB, I2C, Bluetooth, Wi-Fi, IR and other wireless or wired transmission interfaces. In an example of the present invention, data transmitted can be positions (e.g. coordinates), identified results (e.g. gesture codes), commands, sensing information or other information provided by the controller 160.

In an example of the present invention, the sensing information can be initial sensing information generated under the control of the processor 161, and this information is passed onto the host 170 for position analysis, such as position analysis, gesture determination, command identification, and so on. In another example of the present invention, the sensing information can be analyzed by processor 161 first before forwarding the determined positions, gestures, commands, or the like to the host 170. The present invention does not limit to this example, and one with ordinary skill in the art can readily recognize other interactions between the controller 160 and the host 170.

At each intersection of the conductive strips, the upper and lower conductive strips form the positive and negative electrodes. Each intersection can be regarded as one pixel in an image. When one or more external conductive objects approach or touch the sensing device, said image can be regarded as a photographed touch image (e.g. the pattern of a finger upon touching the sensing device).

When a driven conductive strip is being provided with a driving signal, the driven conductive strip itself produces self capacitance, and produces mutual capacitance on each intersection of the driven conductive strip. Said self-capacitive detection is detecting the self-capacitance of all the conductive strips, which is particularly useful in determining approach or touch of a single external conductive object.

In said mutual-capacitive detection, when a driven conductive strip is being provided with a driving signal, capacitances or changes in capacitances of all intersections on the driven conductive strip are detected with all sensed conductive strips arranged in different dimensions to the driven conductive strip, and are regarded as a row of pixels. Accordingly, all the rows of pixels are combined to form said image. When one or more external conductive objects approach or touch the sensing device, said image can be regarded as a photographed touch image, which is particularly useful in determining approaches or touches of a plurality of external conductive objects.

These conductive strips (the first and second conductive strips) can be made of transparent or opaque materials, such as transparent Indium Tin Oxide (ITO). In terms of the structure, it can be categorized into a Single ITO (SITO) structure and a Double ITO (DITO) structure. One with ordinary skill in the art can appreciate that other materials can be used as the conductive strips, such as carbon nanotube, and they will not be further described.

In an example of the present invention, the horizontal direction is regarded as the first direction, while the vertical direction is regarded as the second direction. Thus, the horizontal conductive strips are the first conductive strips, and the vertical conductive strips are the second conductive strips. However, one with ordinary skill in the art can appreciate that the above is merely an example of the present invention, and the present invention is not limited to this. For example, the vertical direction can be regarded as the first direction, while the horizontal direction can be regarded as the second direction.

During 2D mutual capacitive detection, alternating driving signals are sequentially provided to each first conductive strip, and 1D sensing information corresponding to each driven first conductive strip is obtained from the signals of the second conductive strips. Sensing information of all the first conductive strips are combined together to form 2D sensing information. 1D sensing information can be generated based on the signal of a second conductive strip, or based on the difference between the signal of a conductive strip and a reference value. In addition, the sensing information can be generated based on current, voltage, level of capacitive coupling, amount of charge or other electrical characteristics, and can be in analog or digital form.

When there is no external object actually approaching or covering the touch screen, or when the system has not determined any external object actually approaching or covering the touch screen, the position detecting device may generated a reference value based on the signals of the second conductive strips. This reference value represents stray capacitance on the touch screen. Sensing information can be generated based on the signal of a second conductive strip or the result of subtracting the reference value from the signal of the second conductive strip.

In the prior art, capacitive pens are often used as an extension for the hands. The contact area of the pen with the touch screen has to be about the same as that of a finger with the touch screen under normal circumstances in order to obtain sufficient changes in signals and to correctly determine the position of the touch. This area should cover the intersections of several conductive strips.

Figure 1C:
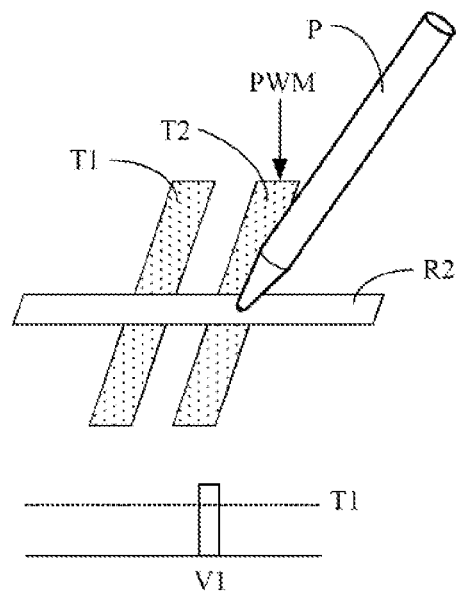
FIGS. 1C to 1E are schematic diagrams illustrating a touch sensor approached or touched by a capacitive pen with a small pen head according to a first embodiment of the present invention.
Figure 1D:
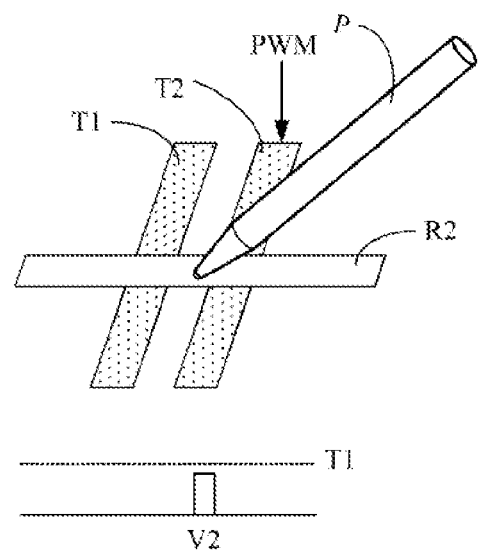
Figure 1E:
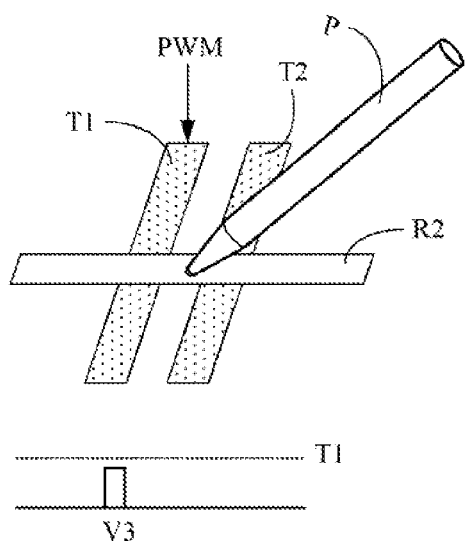

Referring to FIGS. 1C to 1E, a capacitive pen with a small pen head according to a first embodiment is shown. The pen head and the pen body of the capacitive pen P are in contact with each other, such that a hand holding the pen body can be capacitive coupled to a touch screen via the pen head. In addition, the diameter of the contact area of the pen head of the capacitive pen P with the touch screen is less than about 3 mm. In a preferred example of the present invention, the diameter of the contact area of the pen head of the capacitive pen P with the touch screen is about 2.2 mm. During mutual capacitive detection, when a driving signal (e.g. a pulse-width modulation (PWM) signal) is provided to a first conductive strip (e.g. a first conductive strip Tx1 or Tx2), changes in capacitive coupling at each intersection on the first conductive strip is detected through each second conductive strip (e.g. a second conductive strip Rx2) intersecting the first conductive strip. When the capacitive pen P approaches or touches an intersection (e.g. the intersection of the first conductive strip Tx2 and the second conductive strip Rx2), the detected change in capacitive coupling V1 may be larger than a first threshold T1. However, if the capacitive pen P moves to a place between two intersections (e.g. between the intersection of the first conductive strip Tx1 and the second conductive strip Rx2 and the intersection of the first conductive strip Tx2 and the second conductive strip Rx2), then the changes in capacitive coupling V2 and V3 at the two intersections may be lower than the first threshold T1. As a result, the position of the pen cannot be determined.

Figure 1F:
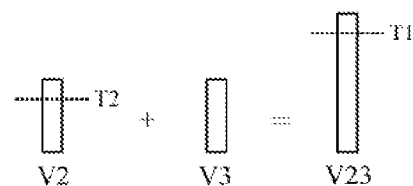
FIGS. 1F to 1G are schematic diagrams illustrating determining of an approach or a touch by a capacitive pen with a small pen head according to the first embodiment of the present invention.
Figure 1G:
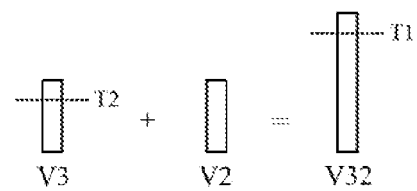

In view of this, referring to FIGS. 1F and 1G, the present invention proposes that when the change in capacitive coupling at an intersection is larger than a second threshold but lower than the first threshold, then by determining whether the sum of the changes in capacitive coupling at adjacent intersections (e.g. V23 or V32) is larger than a threshold, it is determined whether the position of the capacitive pen P is between intersections.

In an example of the present invention, the sum of the changes in capacitive coupling at adjacent intersections may include the sum of the changes in capacitive coupling for one or more adjacent intersections on the same driven conductive strip (first conductive strip). For example, when a first conductive strip is provided with a driving signal, sensing information corresponding to this first conductive strip is formed from the changes in capacitive coupling detected from a plurality of consecutive second conductive strips. If a value in the sensing information is larger than the second threshold but less than the first threshold, then this value in the sensing information and a previous or a subsequent value is added together for comparing with the first threshold.

In another example of the present invention, sensing information (1D sensing information) corresponding to a plurality of conductive strips form an image (2D sensing information). Each value in the sensing information that is larger than the second threshold but less than the first threshold is the sum of the changes in capacitive coupling at adjacent intersections in the image.

Figure 2A:
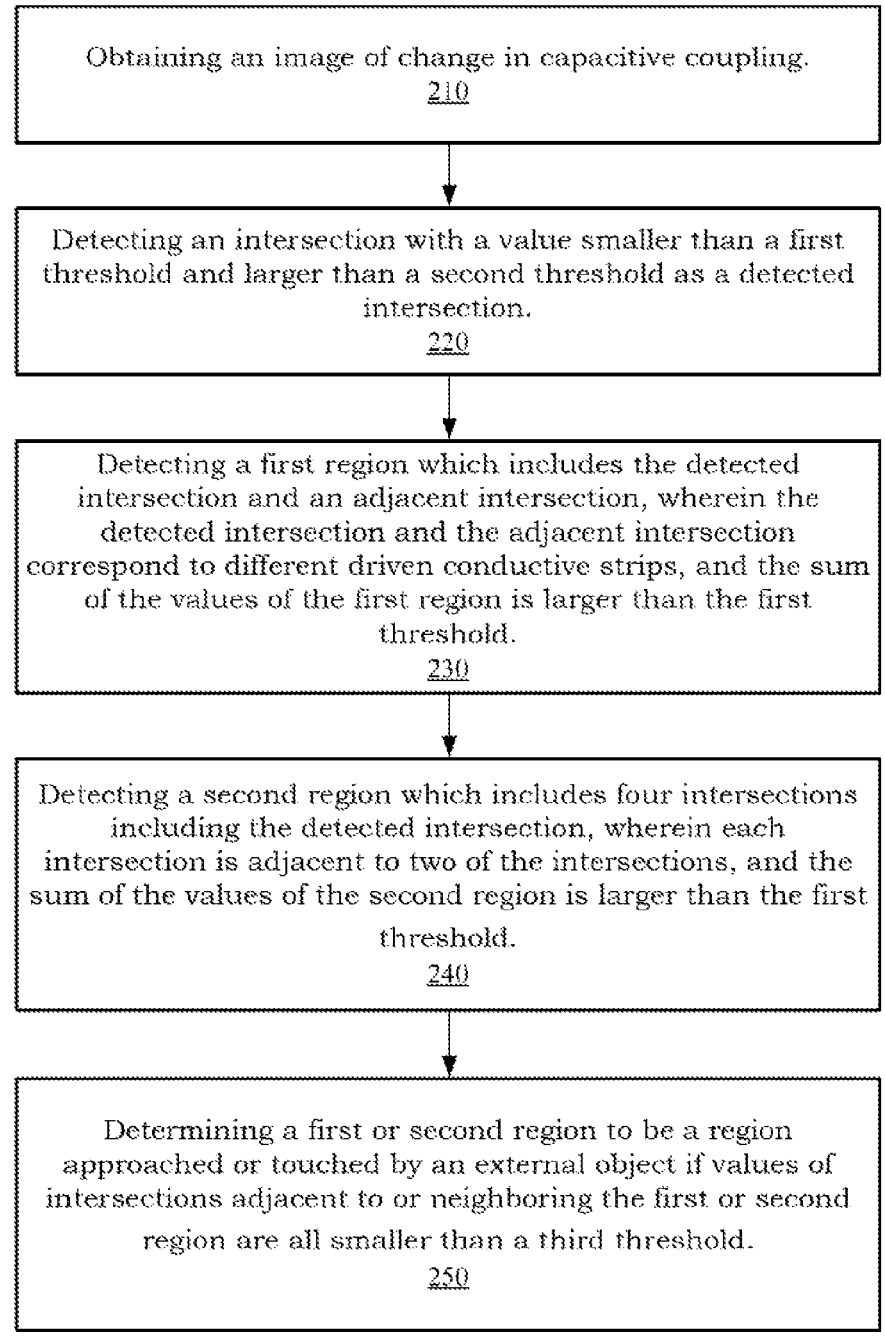
FIG. 2A is a flowchart illustrating detecting of an approach or a touch of a small area according to the first embodiment of the present invention.

Moreover, referring to FIG. 2A, a method for detecting a capacitive pen with a small pen head according to this embodiment is shown. As shown in step 210, an image of change in capacitive coupling is obtained. More specifically, first, an image can be obtained when the touch screen is not approached or touched by any external object. This image is used as a reference image. Then, images are obtained one or several consecutive times. The difference between each obtained image and the reference image is the image of change in capacitive coupling. Values of the image of change in capacitive coupling correspond to a plurality of driven conductive strips (first conductive strips). A value corresponding to each driven conductive strip is generated based on a plurality of sensed conductive strips. Each driven conductive strip (e.g. a first conductive strip) and sensed conductive strip (e.g. a second conductive strip) may correspond to a horizontal coordinate and a vertical coordinate, respectively. Each time a driving signal is provided to a driven conductive strip, the coordinates of each intersection on the driven conductive strip is a 2D coordinate intersected by overlapping driven conductive strip and sensed conductive strip. The 2D coordinate can be written, for example, as (coordinate of the driven conductive strip, coordinate of the sensed conductive strip).

In an example of the present invention two or more adjacent driven conductive strips can be driven simultaneously. For example, when there are N first conductive strips, the driving signal is provided to two adjacent first conductive strips simultaneously at a time, and at least one of the two first conductive strips is not the same between each driving. The conductive strips are driven N−1 times. Compared to the example of driving only one first conductive strip each time that generates an image of change in capacitive coupling (2D sensing information) consisting of N 1D sensing information, driving two adjacent first conductive strips simultaneously at a time will generate an image of change in capacitive coupling consisting of N−1 1D sensing information. In this example, the coordinates for each intersection are effectively a 2D coordinate consisting of the coordinate at the middle of two adjacent driven conductive strips and the coordinate of a sensed conductive strip.

Next, in step 220, each intersection with a value smaller than a first threshold and larger than a second threshold is detected as a detected intersection. Then, in step 230, each first region is detected, which includes the detected intersection and an adjacent intersection. The detected intersection and the adjacent intersection correspond to different driven conductive strips. The sum of the values of the first region (sum of the detected intersection and the adjacent intersection) is larger than the first threshold. Next, in step 240, each second region is detected. The second region encompasses four intersections (including the detected intersection and three other intersections). Each intersection in the second region is adjacent to two other intersections in the second region, and the sum of the values of the second region (sum of the detected intersection and the other three intersections) is larger than the first threshold. In an example of the present invention, the second region is detected if no first region is detected. In another example of the present invention, the second region is detected regardless of whether a first region is detected or not. In step 250, when values of intersections adjacent to or neighboring the first region or the second region are all smaller than a third threshold, then the first or second region is determined to be a region approached or touched by an external conductive object.

Referring to FIGS. 2B to 2G, the matrix shown indicates intersections (intersection 00, intersection 01, . . . intersection 04, intersection 10, intersection 11, . . . intersection 44) of five first conductive strips (driven conductive strips) and five second conductive strips (sensed conductive strips), wherein the intersections 00, 01, 02, 03 and 04 are intersections on the first conductive strip T0; the intersections 10, 11, 12, 13 and 14 are intersections on the first conductive strip T1; and so on.

Figures 2B, 2C, 2D, 2E, 2F, 2G:
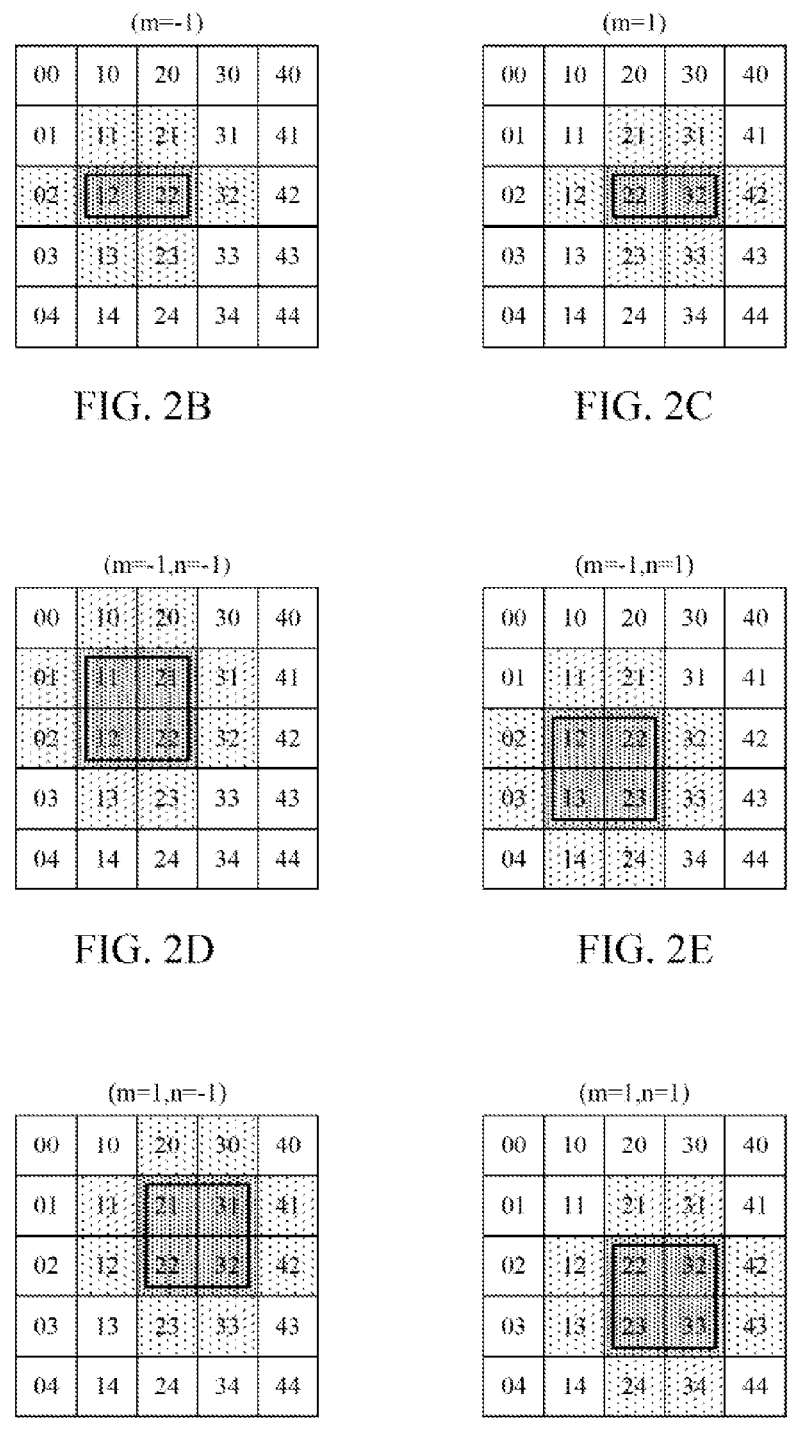

Under the assumption that the intersection 22 is detected as the detected intersection in step 220, then in step 230, possible first regions are shown in FIGS. 2B and 2C, which include the intersections 12 and 22, and the intersections 22 and 32, respectively. If the sum of values of the intersections 12 and 22 is greater than the first threshold, then the intersections 12 and 22 are detected as the first region. Alternatively, if the sum of values of the intersections 22 and 32 is greater than the first threshold, then the intersections 22 and 32 are detected as the first region. On the contrary, if neither the sum of values of the intersections 12 and 22 nor the sum of values of the intersections 22 and 32 is greater than the first threshold, then no first region is detected.

Furthermore, in step 240, possible second regions are shown in FIGS. 2D to 2G, which include the intersections 11, 12, 21 and 22 in FIG. 2D; the intersections 12, 13, 22 and 23 in FIG. 2E; the intersections 21, 22, 31 and 32 in FIG. 2F; and the intersections 22, 23, 32 and 33 in FIG. 2G. If the sum of values of the four intersections in any of FIGS. 2D to 2G is greater than the first threshold, then a second region is detected. Otherwise, if none of the sum of values of the four intersections in FIGS. 2D to 2G is greater than the first threshold, no second region is detected.

In addition, in step 250, assuming the first region is detected as shown in FIG. 2B, then in an example of the present invention, the neighboring intersections of the first regions can be intersections 02, 11, 13, 21, 23 and 32; in another example of the present invention, the neighboring intersections of the first regions can be intersections 01, 02, 03, 11, 13, 21, 23, 31, 32 and 33. The neighboring intersections of the regions shown in FIGS. 2C to 2G can be similarly deduced, and will not be further explained.

Moreover, in a best mode of the present invention, the second threshold and the third threshold are ½ and ¼ of the first threshold, respectively, and wherein the first threshold>the second threshold>the third threshold. One with ordinary skill in the art can appreciate other first, second and third threshold values; the present invention is not limited to the magnitudes described herein.

In a preferred example of the present invention, the pen head of the capacitive pen is thin with a width between about 2 mm~3 mm, which is less than the minimum gap between two parallel conductive strips or two parallel driven conductive strips. For example, the width of the pen head is less than the gap between the center of a conductive strip and the center of another conductive strip, or less than the gap between the center of a first conductive strip and the center of another adjacent first conductive strip.

An algorithm provided based on FIG. 2A is as follows. DD[i][j] indicates an intersection detected in step 220.

```
if( g_ComtParam.m_Ctrl & CTRL_PEN_DETECTION )
{
    if( DD[i][j] > 0 )
    {
        for( m = -1; m <= 1; m+=2 )
        {
            if( DD[i+m][j] > TOUCHTHRESHOLD/2 )
            {
                Sum = DD[i][j] + DD[i+m][j];
                if( Sum >= TOUCHTHRESHOLD )
                {
                    if(   DD[i][j-1] <= TOUCHTHRESHOLD/4 &&
                          DD[i][j+1] <= TOUCHTHRESHOLD/4 &&
                          DD[i+m][j-1] <= TOUCHTHRESHOLD/4 &&
                          DD[i+m][j+1] <= TOUCHTHRESHOLD/4 &&
                          DD[i+2*m][j] <= TOUCHTHRESHOLD/4 &&
                          DD[i-m][j] <= TOUCHTHRESHOLD/4 )
                    {
                        bDetected = 1;       //signal is detected
                        goto EndDetectLinePcs;
                    }
                }
            }
        }
        for( n = -1; n <= 1; n+=2 )
        {
            if( DD[i][j+n] >= 0 &&
                DD[i+m][j] >= 0 &&
                DD[i+m][j+n] >= 0 )
            {
                Sum = DD[i][j]+
                      DD[i][j+n]+
                      DD[i+m][j]+
                      DD[i+m][j+n];
                if( Sum >= TOUCHTHRESHOLD )
                {
                    if( DD[i][j+2*n] <= TOUCHTHRESHOLD/4 &&
                        DD[i][j-n] <= TOUCHTHRESHOLD/4 &&
                        DD[i+m][j+2*n]<= TOUCHTHRESHOLD/4 &&
                        DD[i+m][j-n] <= TOUCHTHRESHOLD/4 &&
                        DD[i+2*m][j+n] <= TOUCHTHRESHOLD/4 &&
                        DD[i+2*m][j] <= TOUCHTHRESHOLD/4 &&
                        DD[i-m][j+n] <= TOUCHTHRESHOLD/4 &&
                        DD[i-m][j] <= TOUCHTHRESHOLD/4 )
                    {
                        bDetected = 1;    // signal is detected
                        goto EndDetectLinePcs;
                    }
                }
            }
        }
    }
}
```

Based on the descriptions above, the present invention provides a device for detecting an approach or a touch of a small area. According to step 210 above, the present invention includes a means for obtaining an image of change in capacitive coupling from a capacitive touch sensor. The capacitive touch sensor includes a plurality of driven conductive strips driven by a driving signal and a plurality of sensed conductive strips providing changes in capacitive coupling. Each time the driving signal is provided, one or more intersections between one or more of the conductive strips being simultaneously driven by the driving signal and each sensed conductive strip generate capacitive coupling. Each value in the image of change in capacitive coupling is the change in capacitive coupling for one of the intersections.

According to step 220, the present invention includes a means for detecting each detected intersection from the image of change in capacitive coupling, wherein the value of the detected intersection is smaller than a first threshold and larger than a second threshold.

According to step 230, the present invention includes a means for detecting each first region, wherein each first region includes one of the detected intersections and an intersection adjacent to the detected intersection, and the sum of values of the first region is greater than the first threshold.

According to step 240, the present invention includes a means for detecting each second region, wherein each second region includes four adjacent intersections including one of the detected intersections, and the sum of values of the second region is greater than the first threshold. As described before, the second region is detected only if no first region is detected. Alternatively, the second region is detected regardless of whether first region is detected or not.

According to step 250, the present invention includes a means for determining a first or second region approached or touched by an external conductive object when at least one first region or at least one second region is detected, wherein the values of all intersections adjacent to the first region or the second region approached or touched by the external conductive object are all smaller than a third threshold.

The above touch sensor may include a plurality of driven conductive strips driven by a driving signal and a plurality of sensed conductive strips providing changes in capacitive coupling. Each time the driving signal is provided, one or more intersections between one or more of the conductive strips being simultaneously driven by the driving signal and each sensed conductive strip generates capacitive coupling. Based on the capacitive coupling, the sensed conductive strips provide changes in capacitive coupling for the intersections. Each value in the image of change in capacitive coupling is the change in capacitive coupling for one of the intersections.

As described before, in an example of the present invention, the first threshold>the second threshold>the third threshold. For example, the second threshold is ½ of the first threshold, and the third threshold is ¼ of the first threshold. In addition, in a best mode of the present invention, the maximum width of the approach or touch of a small area is less than or equal to the gap between the centers of two adjacent conductive strips. For example, the maximum width of the approach or touch of a small area is less than or equal to 3 mm, and the gap between the centers of two adjacent conductive strips is below 6.5 mm. The two adjacent conductive strips may be two driven conductive strips or sensed conductive strips arranged adjacent and in parallel with each other.

The above maximum width of the approach or touch of a small area means the maximum width of an applicable range for detecting an approach or a touch of a small area used by the touch sensor of the present invention, rather than the maximum width for detecting an approach or a touch of an external conductive object by the touch sensor of the present invention. When the approach or touch of an external conductive object is larger than the maximum width of an approach or a touch of a small area, normal detecting method can be used for detecting. For example, detecting without determining the first region or the second region. As such, the present invention may detect the approach or touch of ordinary external conductive objects, and also detect the approach or touch of external conductive objects with small areas. For example, when the external conductive object is a pen, the coupled area on the touch sensor caused by a touch or an approach of the pen is less than or equal to the above maximum width of an approach or a touch of a small area. As another example, when an external conductive object approaches (suspends in the air) above the touch sensor, the area of capacitive coupling between the external conductive object and the touch sensor would be relatively smaller than the area of capacitive coupling with the touch sensor while the external conductive object is touching the touch sensor. When the area of capacitive coupling on the touch sensor which an external conductive object is capable of causing is less than or equal to the above maximum width of an approach or a touch of a small area, it can be regarded as the approaching of an external conductive object of a small area.

Accordingly, an example of the present invention further includes: detecting each intersection with a value larger than a first threshold from an image of change in capacitive coupling, and when at least one intersection with a value larger than the first threshold is detected, determining a single intersection of an approach or a touch of a small area for each external conductive object, wherein all intersections adjacent to the single intersection of the approach or touch of a small area for each external conductive object are smaller than the first threshold.

In an example of the present invention, step 250 may be performed after step 230. Step 250 may also be performed after step 240. In another example of the present invention, step 250 is performed after both steps 230 and 240 are completed.

The above embodiments are only used to illustrate the principles of the present invention, and they should not be construed as to limit the present invention in any way. The above embodiments can be modified by those with ordinary skill in the art without departing from the scope of the present invention as defined in the following appended claims.

What is claimed is:

1. A method for detecting an approach or a touch of a small area, comprising:

obtaining an image of change in capacitive coupling from a capacitive touch sensor, wherein the capacitive touch sensor includes a plurality of driven conductive strips driven by a driving signal and a plurality of sensed conductive strips providing changes in capacitive coupling, each time the driving signal is provided, one or more intersections between one or more of the conductive strips being simultaneously driven by the driving signal and each sensed conductive strip generate capacitive coupling, and each value in the image of change in capacitive coupling is the change in capacitive coupling for one of the intersections, wherein the image of change in capacitive coupling is generated by an external conductive object, and a maximum width of the approach or touch of a small area by the external conductive object is less than a distance between centers of two conductive strips arranged adjacent and in parallel with each other;

detecting each detected intersection from the image of change in capacitive coupling, wherein a value of the detected intersection is smaller than a first threshold and larger than a second threshold and said value of the detected intersection is added to an adjacent intersection value for comparing with the first threshold, wherein the second threshold is ½ of the first threshold, and the first and second thresholds are set before obtaining the image;

detecting each first region, wherein each first region includes one of the detected intersections and an intersection adjacent to the detected intersection, and a sum of values of the first region is greater than the first threshold; and detecting each second region if no first region is detected, wherein each second region includes four adjacent intersections including one of the detected intersections, and a sum of values of the second region is greater than the first threshold.

2. The method of claim 1, wherein further comprising determining the first region or the second region approached or touched by the external conductive object when at least one first region or at least one second region is detected, wherein the values of all intersections adjacent to the first region or the second region approached or touched by the external conductive object are all smaller than a third threshold.

3. The method of claim 2, wherein the first threshold>the second threshold>the third threshold.

4. The method of claim 2, wherein the third threshold is ¼ of the first threshold.

5. The method of claim 1, wherein the two conductive strips arranged adjacent and in parallel with each other are the driven conductive strips or the sensed conductive strips.

6. The method of claim 1, wherein each first region or second region determined to be approached or touched by an external conductive object is a first region or a second region approached or touched by a pen, wherein the maximum width on the touch sensor touched by the pen is less than or equal to 3 mm.

7. A device for detecting an approach or a touch of a small area, comprising:
a memory, wherein a plurality of programs are stored in the memory; and
a processor accessing the programs and executing the following operations:
obtaining an image of change in capacitive coupling from a capacitive touch sensor, wherein the capacitive touch sensor includes a plurality of driven conductive strips driven by a driving signal and a plurality of sensed conductive strips providing changes in capacitive coupling, each time the driving signal is provided, one or more intersections between one or more of the conductive strips being simultaneously driven by the driving signal and each sensed conductive strip generate capacitive coupling, and each value in the image of change in capacitive coupling is the change in capacitive coupling for one of the intersections, wherein the image of change in capacitive coupling is generated by an external conductive object, and a maximum width of the approach or touch of a small area by the external conductive object is less than a distance between centers of two conductive strips arranged adjacent and in parallel with each other;
detecting each detected intersection from the image of change in capacitive coupling, wherein a value of the detected intersection is smaller than a first threshold and larger than a second threshold and said value of the detected intersection is added to an adjacent intersection value for comparing with the first threshold, wherein the second threshold is ½ of the first threshold, and the first and second thresholds are set before obtaining the image;
detecting each first region, wherein each first region includes one of the detected intersections and an intersection adjacent to the detected intersection, and a sum of values of the first region is greater than the first threshold; and
detecting each second region if no first region is detected, wherein each second region includes four adjacent intersections including one of the detected intersections, and a sum of values of the second region is greater than the first threshold.

8. The device of claim 7, wherein the processor further executes the following operations: determining the first region or the second region approached or touched by the external conductive object when at least one first region or at least one second region is detected, wherein the values of all intersections adjacent to the first region or the second region approached or touched by the external conductive object are all smaller than a third threshold.

9. The device of claim 8, wherein the first threshold>the second threshold>the third threshold.

10. The device of claim 8, wherein the third threshold is ¼ of the first threshold.

11. The device of claim 7, wherein the two conductive strips arranged adjacent and in parallel with each other are the driven conductive strips or the sensed conductive strips.

12. The device of claim 7, wherein each first region or second region determined to be approached or touched by an external conductive object is a first region or a second region approached or touched by a pen, wherein the maximum width on the touch sensor touched by the pen is less than or equal to 3 mm.

13. A method for detecting an approach or a touch of a small area, comprising:
obtaining an image of change in capacitive coupling from a capacitive touch sensor, wherein the capacitive touch sensor includes a plurality of driven conductive strips driven by a driving signal and a plurality of sensed conductive strips providing changes in capacitive coupling, each time the driving signal is provided, one or more intersections between one or more of the conductive strips being simultaneously driven by the driving signal and each sensed conductive strip generate capacitive coupling, and each value in the image of change in capacitive coupling is the change in capacitive coupling for one of the intersections, wherein the image of change in capacitive coupling is generated by an external conductive object, and a maximum width of the approach or touch of a small area by the external conductive object is less than a distance between centers of two conductive strips arranged adjacent and in parallel with each other;
detecting each detected intersection from the image of change in capacitive coupling, wherein a value of the detected intersection is smaller than a first threshold and larger than a second threshold and said value of the detected intersection is added to an adjacent intersection value for comparing with the first threshold, wherein the second threshold is ½ of the first threshold, and the first and second thresholds are set before obtaining the image; and
detecting each first region, wherein each first region includes one of the detected intersections and an intersection adjacent to the detected intersection, and a sum of values of the first region is greater than the first threshold.

14. The method of claim 13, further comprising:
when at least one first region is detected, detecting the first region approached or touched by the external conductive object, wherein a plurality of values of all intersections adjacent to the first region approached or touched by the external conductive object are all smaller than a third threshold.

15. The method of claim 14, further comprising:
detecting each second region, wherein each second region includes four adjacent intersections including one of the detected intersection, and a sum of values of the second region is greater than the first threshold; and
when at least one second region is detected, detecting a second region approached or touched by an external conductive object, wherein a plurality of values of all intersections adjacent to the second region approached or touched by the external conductive object are all smaller than the third threshold.

16. The method of claim 14, wherein the first threshold>the second threshold>the third threshold.

17. The method of claim 14, wherein the third threshold is ¼ of the first threshold.

18. The method of claim 13, wherein the two conductive strips arranged adjacent and in parallel with each other are the driven conductive strips or the sensed conductive strips.

19. The method of claim 13, wherein each first region or second region determined to be approached or touched by an external conductive object is a first region or a second region approached or touched by a pen, wherein a maximum width on the touch sensor touched by the pen is less than or equal to 3 mm.

20. A device for detecting an approach or a touch of a small area, comprising:
a memory, wherein a plurality of programs are stored in the memory; and
a processor accessing the programs and executing the following operations:
obtaining an image of change in capacitive coupling from a capacitive touch sensor, wherein the capacitive touch sensor includes a plurality of driven conductive strips driven by a driving signal and a plurality of sensed conductive strips providing changes in capacitive coupling, each time the driving signal is provided, one or more intersections between one or more of the conductive strips being simultaneously driven by the driving signal and each sensed conductive strip generate capacitive coupling, and each value in the image of change in capacitive coupling is the change in capacitive coupling for one of the intersections, wherein the image of change in capacitive coupling is generated by an external conductive object, and a maximum width of the approach or touch of a small area by the external conductive object is less than a distance between centers of two conductive strips arranged adjacent and in parallel with each other;
detecting each detected intersection from the image of change in capacitive coupling, wherein a value of the detected intersection is smaller than a first threshold and larger than a second threshold and said value of the detected intersection is added to an adjacent intersection value for comparing with the first threshold, wherein the second threshold is ½ of the first threshold, and the first and second thresholds are set before obtaining the image; and
detecting each first region, wherein each first region includes one of the detected intersections and an intersection adjacent to the detected intersection, and a sum of values of the first region is greater than the first threshold.

21. The device of claim 20, wherein the processor further executes the following operations: detecting the first region approached or touched by the external conductive object when at least one first region is detected, wherein a plurality of values of all intersections adjacent to the first region approached or touched by the external conductive object are all smaller than a third threshold.

22. The device of claim 21, further executing the following operations:
detecting each second region, wherein each second region includes four adjacent intersections including one of the detected intersection, and a sum of values of the second region is greater than the first threshold; and
detecting a second region approached or touched by an external conductive object when at least one second region is detected, wherein a plurality of values of all intersections adjacent to the second region approached or touched by the external conductive object are all smaller than the third threshold.

23. The device of claim 21, wherein the first threshold>the second threshold>the third threshold.

24. The device of claim 21, wherein the third threshold is ¼ of the first threshold.

25. The device of claim 20, wherein the two conductive strips arranged adjacent and in parallel with each other are the driven conductive strips or the sensed conductive strips.

26. The device of claim 20, wherein each first region or second region determined to be approached or touched by an external conductive object is a first region or a second region approached or touched by a pen, wherein a maximum width on the touch sensor touched by the pen is less than or equal to 3 mm.

* * * * *